(No Model.)
W. H. SPEER.
PLANT SUPPORT.
No. 601,782. Patented Apr. 5, 1898.
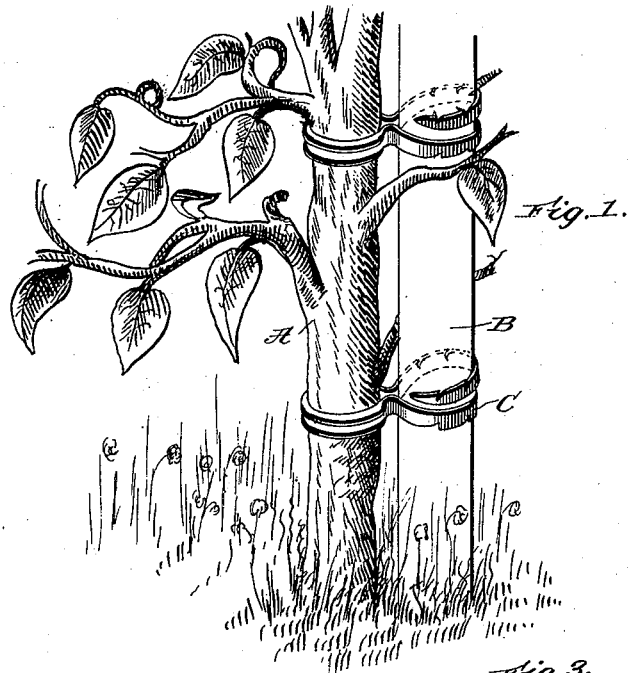
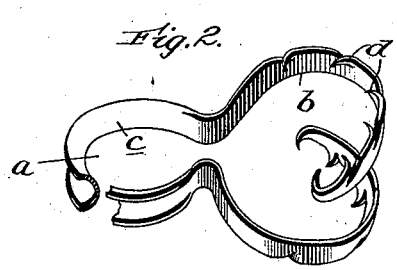
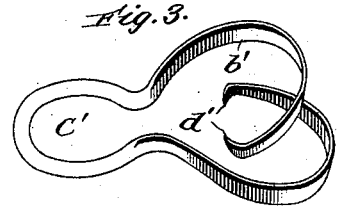
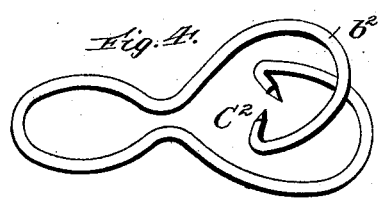
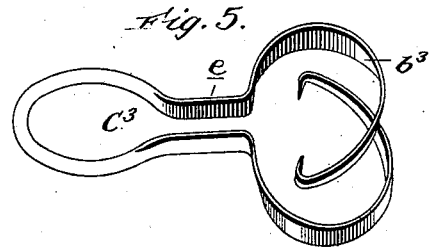
Witnesses:
Inventor
W. H. Speer
By James J. Sheehy
Attorney

UNITED STATES PATENT OFFICE.

WILLIAM H. SPEER, OF MARTINSVILLE, MISSISSIPPI.

PLANT-SUPPORT.

SPECIFICATION forming part of Letters Patent No. 601,782, dated April 5, 1898.

Application filed December 22, 1897. Serial No. 663,053. (No model.)

*To all whom it may concern:*

Be it known that I, WILLIAM H. SPEER, a citizen of the United States, residing at Martinsville, in the county of Copiah and State of Mississippi, have invented certain new and useful Improvements in Plant-Supports; and I do declare the following to be a full, clear, and exact description of the invention, such as will enable others skilled in the art to which it appertains to make and use the same.

My invention relates to means for fastening plants to supporting-stakes; and it contemplates the provision of a very cheap and simple tie through the medium of which a growing plant may be expeditiously connected to an adjacent stake or other support and one which when properly placed in position is not liable to fall or be casually disconnected or displaced.

With the foregoing ends in view the invention will be fully understood from the following description and claims when taken in conjunction with the annexed drawings, in which—

Figure 1 is a perspective view illustrating two of my improved ties as connecting a plant to an adjacent stake, the size of the plant and stake being exaggerated in order to better illustrate the invention. Fig. 2 is a broken perspective view of one of the ties removed, and Figs. 3, 4, and 5 are perspective views of modified embodiments of the invention.

Referring by letter to the said drawings, and more particularly to Figs. 1 and 2 thereof, A designates a growing plant. B designates a stake sunk in the ground and arranged adjacent to the stalk of the plant, and C designates my improved tie, of which one or more may be employed in conjunction with each plant and stake, as is found necessary. This tie C in the preferred embodiment of the invention is formed of a single thin strip of spring-steel or other suitable resilient material, the same being bent, as better shown in Fig. 2, to form the approximately circular loop $a$, having the open mouth and designed for the reception of the stalk of the plant or vine to be supported, and the terminal arms $b$, which are curved, as shown, so as to enable them to embrace the stake after the manner illustrated in Fig. 1. That portion of the strip of steel which forms the loop $a$ is bent in the direction of its width, so as to afford the convex surface $c$ contiguous to the stalk, and thus prevent the tie from injuring the same, while the arms $b$ are provided at their ends and at intermediate points of their length with barbs $d$, which are designed to be embedded in the stake, so as to hold the tie against downward movement on the stake and prevent its casual disconnection or displacement therefrom. In addition to affording a convex surface $c$ the bending of that portion of the piece of metal forming loop $a$ in the direction of its width renders the tie very strong and resilient.

In connecting a plant to a stake with my improved tie it is simply necessary for the operator to spread the arms $b$ apart, so as to permit the stalk of the plant to enter the loop $a$ through the open mouth thereof, and then release the arms $b$ on the stake. With this done the barbs $d$ of arms $b$ will enter the stake and, as before stated, will serve effectually to prevent casual movement or disconnection of the tie.

It will be appreciated from the foregoing that through the medium of my cheap and simple ties a field-hand may connect plants to stakes much more quickly and easily than when the plants are tied with cord, wire, or the like. It will also be appreciated that when the crop is gathered the ties may be readily removed from the plants and stakes and put away until it is desired to again use them.

When the ties are to be repeatedly used, it is necessary to adopt some means for preventing deterioration of the same when exposed to the elements. To this end I contemplate japanning the ties or coating them with a solution of coal-tar, either of which will prevent corrosion of the metal.

In Fig. 3 of the drawings I have shown a tie $C'$ made of wire, with its portions forming the stake-embracing arms $b'$ flattened, so as to render them more resilient, and provided with barbs $d'$ at their ends only. This tie, while efficient in operation, is exceedingly cheap and simple, as will be readily appreciated by reference to Fig. 3.

In Fig. 4 I have shown a modification $C^2$, which is similar to the embodiment illustrated in Fig. 3, with the exception that the stake-embracing arms $b^2$ are not flattened, while in Fig. 5 is disclosed a modification $C^3$, which is like that of Fig. 3, with the exception that a neck $e$ is interposed between the stalk-receiving loop $a'$ and the stake-embracing arms $b^3$. This modification $C^3$ is designed for use when it is desirable to hold the stalk of a plant away from the stake.

Having thus described my invention, what I claim is—

1. The herein-described tie, for connecting plants to supports, formed of a single piece of spring metal and comprising the plant-receiving loop having a convex inner side and also having the open mouth, and the outwardly-curved arms forming the terminals of the loop; said arms being adapted to embrace a support and terminating in barbs adapted to be embedded in the same, substantially as specified.

2. The herein-described tie, for connecting plants to supports, formed of a single strip of spring sheet metal and comprising the plant-receiving loop of concavo-convex form in cross-section having its convex side inward and also having an open mouth, and the outwardly-curved arms forming the terminals of the loop; said arms being adapted to embrace a support and terminating in barbs struck from one of their edges at intervals on their length, substantially as specified.

In testimony whereof I affix my signature in presence of two witnesses.

WM. H. SPEER.

Witnesses:
 J. L. ARD,
 R. P. WILLING.